Feb. 19, 1963 C. A. CRAFTS ET AL 3,078,344

PHASE DEMODULATION OF KEYED CARRIER BY USE OF SYNCHRONOUS GATING, WITH PHASE LOCK DRIVEN STEP WISE IN RESPONSE TO FORBIDDEN OUTPUT

Filed Oct. 25, 1960 6 Sheets-Sheet 1

Feb. 19, 1963 C. A. CRAFTS ET AL 3,078,344

PHASE DEMODULATION OF KEYED CARRIER BY USE OF SYNCHRONOUS GATING, WITH PHASE LOCK DRIVEN STEP WISE IN RESPONSE TO FORBIDDEN OUTPUT

Filed Oct. 25, 1960 6 Sheets-Sheet 3

PHASE DEMODULATION OF KEYED CARRIER BY USE OF SYNCHRONOUS GATING, WITH PHASE LOCK DRIVEN STEP WISE IN RESPONSE TO FORBIDDEN OUTPUT

Filed Oct. 25, 1960

United States Patent Office 3,078,344
Patented Feb. 19, 1963

3,078,344

PHASE DEMODULATION OF KEYED CARRIER BY USE OF SYNCHRONOUS GATING, WITH PHASE LOCK DRIVEN STEP WISE IN RESPONSE TO FORBIDDEN OUTPUT

Cecil A. Crafts, Santa Ana, and Perry H. Goodwin, Jr., Corona del Mar, Calif., assignors to Robertshaw-Fulton Controls Company, Richmond, Va., a corporation of Delaware Filed Oct. 25, 1960, Ser. No. 64,856
20 Claims. (Cl. 178—88)

The invention presented herein relates to the transmission of information by phase shift keyed signals and more specifically to improved demodulation therefor.

In a communication system using phase shift keyed signals, the information desired to be transmitted is impressed upon a carrier signal of a given frequency by effecting predetermined phase shifts in the carrier signal corresponding to the information to be transmitted. A phase shift keyed signal is thus a signal of a particular frequency that has portions that are of some arbitrarily designated zero phase and other portions that differ in phase from the zero phase portions.

No demodulation problem is presented when the carrier signal is available at the reciver along with the phase shift keyed signal. However, the limitations ordinarily imposed on band width, system complexity and power make it difficult to devise a practical system in which the carrier signal is available at the receiver. Therefore, effort has been made to devise ways for producing a phase reference locally at the receiver that can be used to demodulate the received phase shift keyed signal. Previously, this had been done by providing a local oscillator at the receiver operating at the frequency of the carrier signal. Lack of stability of the oscillator of such systems has created problems. Another previous approach has been to use the phase shift keyed signal to obtain the phase reference needed. This approach is used in the detector circuits embodying the present invention. For satisfactory operation, however, it is necessary that synchronization between the phase reference developed at the receiver end and the received signal be automatically established when the system is placed in operation and following any loss of synchronization. To prevent the loss of information, it is essential that synchronization of the detector circuit be established as rapidly as possible.

It is a prime object of the invention disclosed herein to provide detector circuitry which provides for rapid synchronization between the phase reference developed at the receiver and the received phase shifted keyed signal and to rapidly reestablish the proper synchronization following any loss of synchronization.

The received phase shift keyed signal may differ slightly in frequency from its frequency at the transmitter. It is desirable that the detector circuit at the receiver automatically compensate for such change in frequency to provide a more accurate phase reference.

It is, therefore, another object of the invention described herein to provide improved frequency control of the reference signal developed from the phase shift keyed signal.

This invention is particularly applicable to the demodulation of phase shift keyed signals in which the various phase portions differ in phase from the zero phase portions by a whole multiple of an increment of phase angle $\theta$, where 360° divided by $\theta$ equals N, where N is a whole number greater than two with at least one possible phase portion not being used. Thus, if the phase angle $\theta$ is 120°, there are three possible phase portions. These are 0°, 120°, and 240° or −120°. Either the 120° or 240° phase portions would not be present in the phase shift keyed signal. The other two phase portions would be used to convey information. Similarly, if the angle $\theta$ is 72°, there are five possible phase portons. These are 0°, 72°, 144°, 216°, and 288°. The phase shift keyed signal may then consist of 0° phase portions and not more than three of the remaining portions. In a system of N allocated phase angles of which one is not used, the number of phase angles ($N-1$) may be expressed as $n$, where $n+1$ equals N.

Detector circuits constructed in accordance with this invention for detecting phase shift keyed signals of the type described provide means for developing a series of pulses corresponding to the transitions in the phase shift keyed signal from a given polarity to the other which are applied to a plurality of gating circuits. The gating circuits are further controlled by gating signals supplied from a gating generator. A gating circuit is provided for each phase that is transmitted and for each phase that is not transmitted.

The gating generator has a pluarlity of output signals which occur in sequence with only one output signal occurring at any one time. Each gating circuit is supplied with a different one of the output signals. The repetition rate of the gating signals is determined by the frequency of the output of a signal generator. The pulses representative of the transitions in the phase shift keyed signal from a given polarity to the other are applied to the signal generator directly via the various gating circuits to synchronize the operation of the signal generator.

The presence of an output only from those gating circuits provided to detect the phase portions transmitted indicates that the gating signals supplied by the gating generator are being applied to the gating circuit at the proper time. The presence of an output from at least one of the other gating circuits indicates the gating signals are not being applied to the gating circuit at the proper time and is utilized to resynchronize the signals supplied by the gating generator with respect to the phase shift keyed signal.

For a better understanding of the present invention, together with other and further objects thereof, reference is had to the following description taken in connection with the accompanying drawings wherein.

Figure 1:
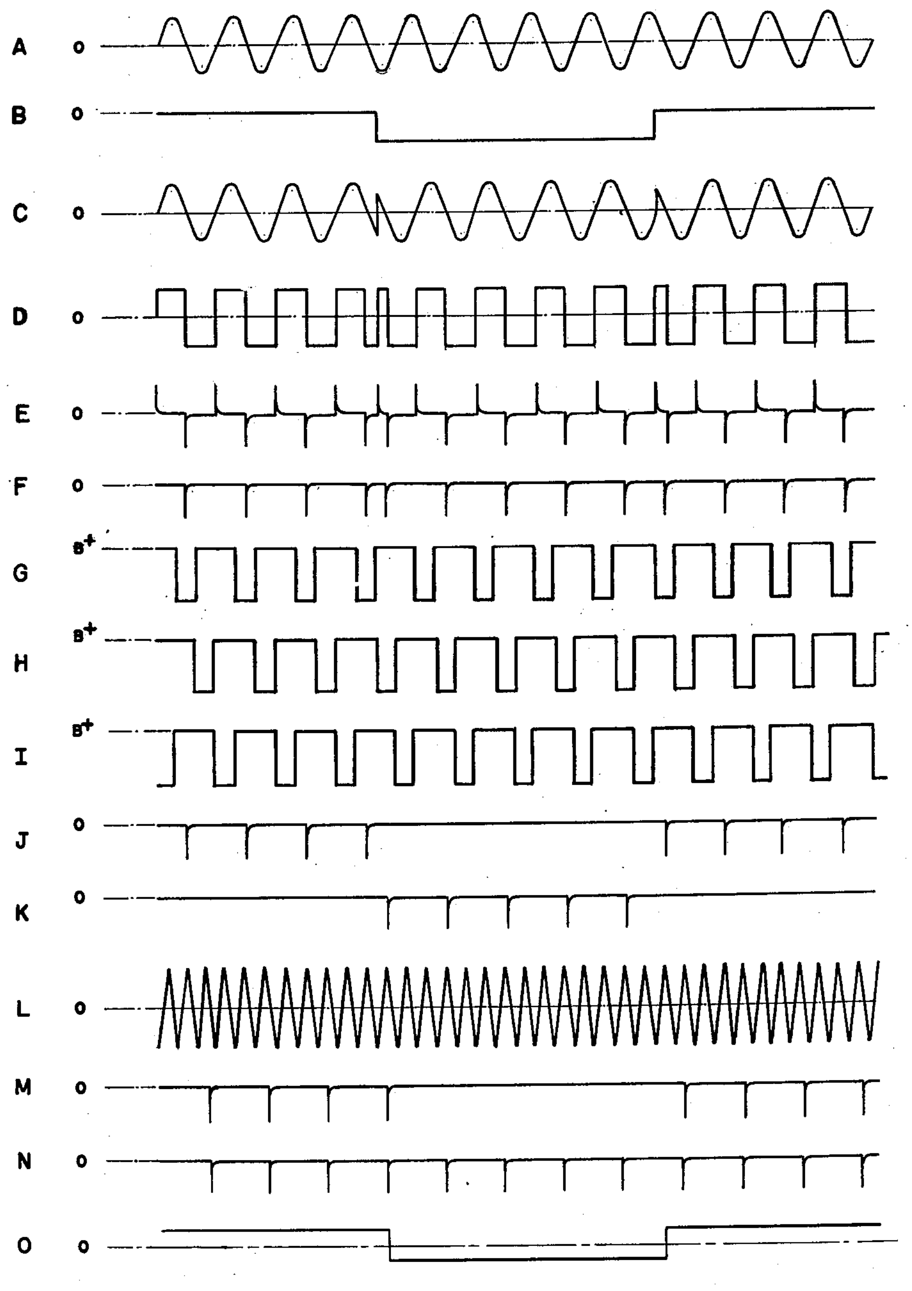
FIG. 1 shows the various waveforms as they appear at different parts of the detector circuits shown in FIGS. 1 and 2.
Figure 2:
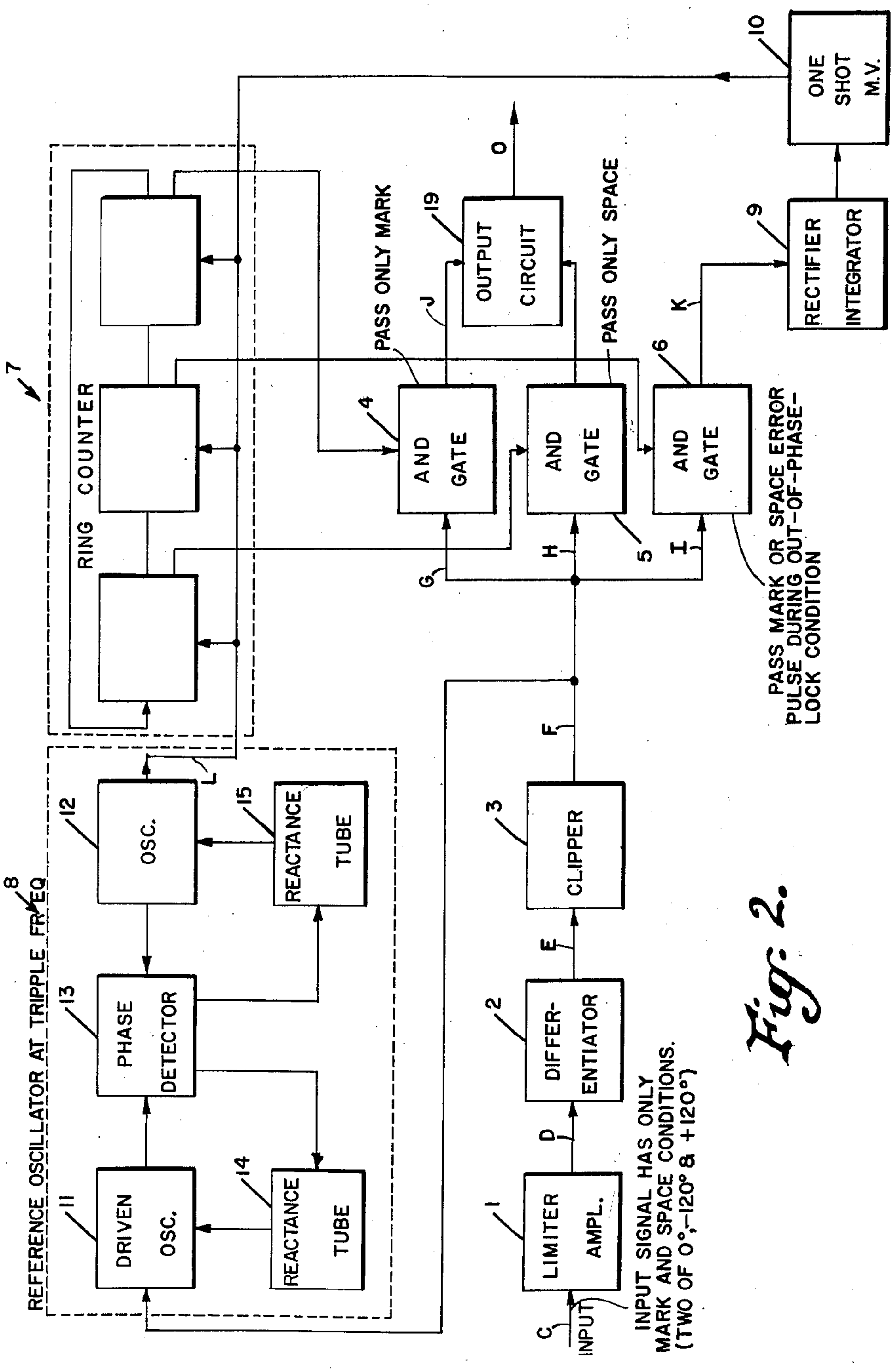
FIG. 2 is a block diagram of a detector circuit for demodulating a phase shift keyed signal in accordance with the present invention.
Figure 3:
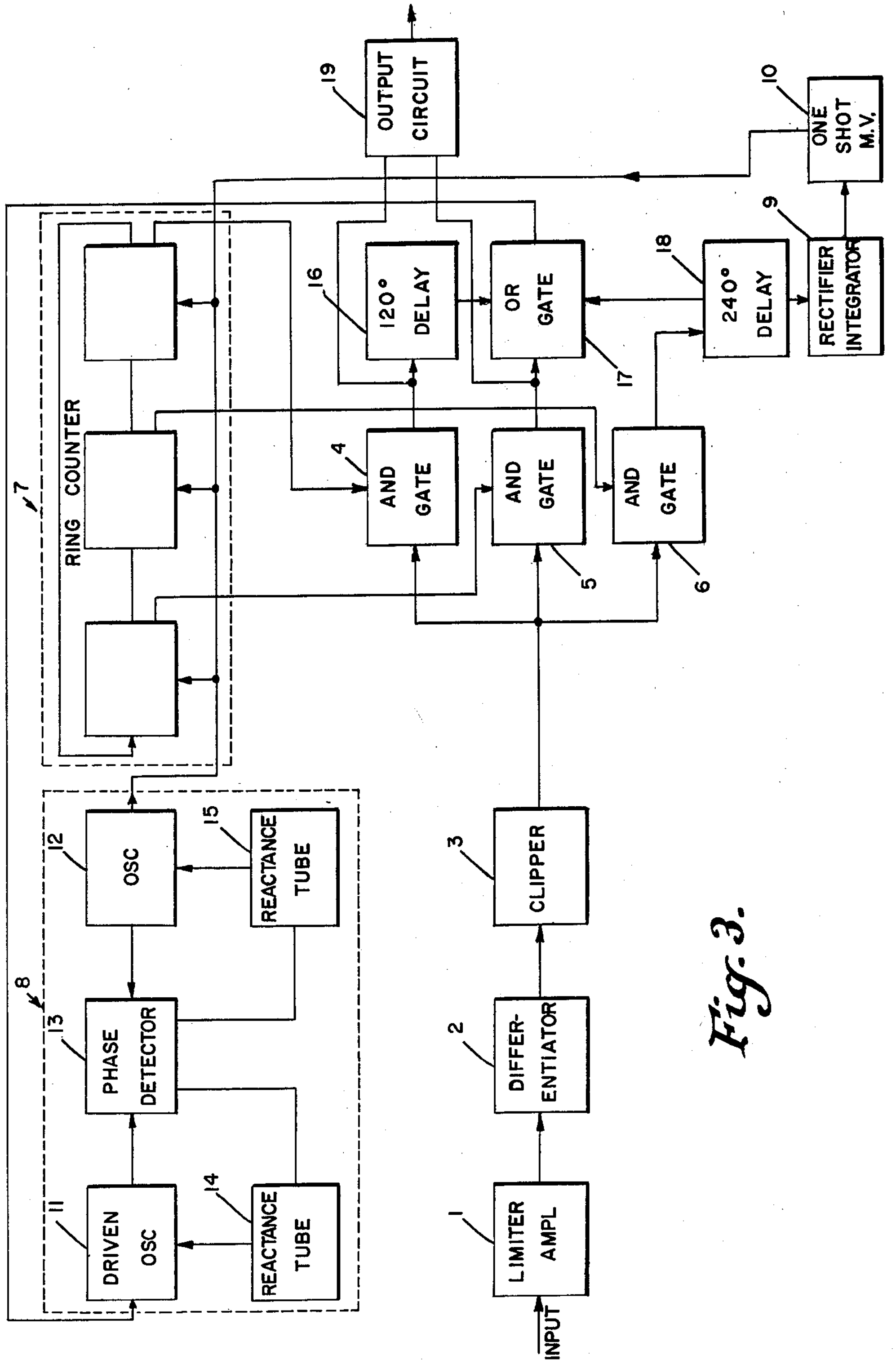
FIG. 3 is a block diagram of another detector circuit for demodulating a phase shift keyed signal in accordance with the present invention.

Referring now to FIG. 1 of the drawings, there is represented the various waveforms used to explain the operation of the circuits illustrated in FIGS. 2 and 3 which embody the invention. The sine wave shown at A of FIG. 1 of the accompanying drawings represents the carrier signal prior to being phase shift keyed in accordance with the intelligence desired to be transmitted. The waveform represented at B of FIG. 1 shows a typical information signal used to key the carrier signal. An information signal of this type may be supplied by a teletype transmitter. There is no limitation on the duration of the signal in any one phase. For purposes of illustration, a 120° phase shift system is used in which one of the three possible phases is not transmitted. The phase shift keyed signal is indicated at C of FIG. 1 and consists only of portions that are of 0° phase and portions that are shifted 240° or −120°. There are no portions transmitted that have a phase of 120°. For purposes of illustration, the 0° phase portions are transmitted in response to portions like the first or "mark" portion of the keying waveform B and the −120° phase portions in response to the portions like the central or "space" portion of the keying waveform. The phase shift keyed signal at C that is to be operated on by the detector circuit thus has a first portion that is of 0° phase, followed by a −120° phase portion, then a 0° phase portion and so on. The apparatus used to accomplish the phase shift keying of the carrier signal does not form a part of this invention and, therefore, is not discussed.

Referring more particularly to FIG. 2 of the drawings, there is represented in block diagram form a detector circuit for demodulating the phase shift keyed signal shown in FIG. 1 at C. The detector circuit includes means for developing from the phase shift keyed signal of FIG. 1C, a series of unidirectional pulses representative of transitions in the phase shift keyed signal from a given polarity to the other. Such means may include a limiter-amplifier 1 to which the phase shift keyed signal is applied, a differentiating circuit 2 connected to the output of the limiter-amplifier 1, and a clipping circuit 3 connected to the output of the differentiating circuit 2. The output of the limiter-amplifier 1 is shown at D in FIG. 1, while the waveform E in FIG. 1 represents the output of the differentiating circuit 2. The output of the clipping circuit 3 is shown at F in FIG. 1 and consists of a series of negative going pulses. Referring to the waveforms at C and F of FIG. 1, it can be seen that the negative pulses of waveform F correspond to the transitions from positive to negative polarity of the waveform at C. The negative pulses of waveform F are equally spaced along the time axis, except that those appearing during the −120° phase portion of the phase shift keyed signal are offset ⅓ of the period of the carrier signal from those of the 0° phase portion. It should be appreciated that the clipping circuit 3 could be arranged so that the output of the clipping circuit would be a series of positive going pulses rather than the negative going pulses shown at F in FIG. 1. In such a case, the positive going pulses would correspond to the negative to positive polarity transitions in the phase shift keyed waveform.

The output of the clipping circuit 3 is applied to coincidence or "and" gating circuits 4 and 5, one for each different phase portion transmitted and to a coincidence or "and" gating circuit 6. An output pulse is obtained from gating circuit 4 provided a second input signal or gating signal is present at the same time that a pulse from clipping circuit 3 is present at gating circuit 4. The same is true of gating circuits 5 and 6.

A gating signal generator 7 is used to provide the second input signals for gating circuits 4, 5, and 6. For proper operation of the detector circuit, the gating signal supplied to gating circuit 4 by the gating signal generator 7 must be present at the gating circuit 4 at the same time the pulses of waveform E corresponding in time to the polarity transitions in the 0° phase portions of the phase shift keyed signal are present at gating circuit 4. In addition, the gating signal supplied to gating circuit 5 by gating generator 7 must be present at the gating circuit 5 at the same time the pulses of waveform E corresponding in time to the polarity transitions in the −120° phase portions of the phase shift keyed signal are present at the gating circuit 5. The gating generator 7 supplies gating circuit 6 with a gating signal that would cause gating circuit 6 to pass pulses corresponding to the polarity transitions in the phase shift keyed signal due to 120° phase portions were they present in the phase shift keyed signal. The gating signals for gating circuits 4, 5, and 6 fulfilling these requirements are represented by waveforms G, H, and I of FIG. 1, respectively, each consisting of a series of unidirectional pulses having a repetition rate equal to the frequency of the carrier signal shown in A in FIG. 1. The pulses of waveform G lead the pulses of waveform H by ⅓ of the period of carrier signal A of FIG. 1 and lags the pulses of waveform I by ⅓ of the period of the carrier signal. The output of gating circuit 4 with input signals represented by waveforms F and G includes only the pulses of waveform F derived from the 0° phase portions of the phase shift keyed signal C of FIG. 1 and is illustrated at J of FIG. 1. Waveforms F and H then represent the input signals for gating circuit 5 to produce the output represented by waveform K which includes only the pulses of waveform F derived from the −120° phase portions of the phase shift keyed signal C of FIG. 1. Waveforms F and I then represent the input signals for gating circuit 6. No output pulses are obtained from gating circuit 6, however, since the input pulses of these waveforms are not present at gating circuit 6 at the same time.

A signal generator 8 having a sinusoidal output signal equal three times the frequency of the carrier signal A of FIG. 1 is used to provide a control signal for the gating signal generator 7. The sinusoidal output signal of the signal generator 8 is represented at L of FIG. 1 by the use of straight lines. The signal generator 8 is synchronized by the output pulses of the clipping circuit 3 which, in the circuit shown in FIG. 2, are applied directly to the signal generator 8. The pulses which comprise the output of clipping circuit 3 are shown at F in FIG. 1 and are displaced, relative to any one pulse, at points which are a whole multiple of ⅓ of the period of the carrier signal making it possible to use the output of the clipping circuit 3 for synchronizing the reference signal generator 8 to produce an output signal which is three times the frequency of the carrier signal.

The gating generator 7 is a conventional ring counter type circuit providing a plurality of outputs from an equal number of space discharge devices. The space discharge devices conduct in sequence with only one conducting at any one time. A different one of the space discharge devices used in the ring counter circuit is made conductive at a predetermined point in each cycle of the signal generator output, while the space discharge device that was conductive is turned off. Thus, the length of each output pulse, as shown at G, H, and I, of FIG. 1, is equal to the period of the control signal supplied by the signal generator 8, which in this case, is ⅓ the period of the carrier signal shown at A in FIG. 1.

For proper operation of the detector circuit of FIG. 1, it is necessary that gating circuit 4 receive the gating signal shown at G in FIG. 1 which is in phase with the positive to negative polarity transitions in the 0° phase portions of the phase shift keyed signal and that gating circuit 5 receive the gating signal shown at H in FIG. 1 which is in phase with the positive to negative polarity transitions in the 240° phase portions of the phase shift keyed signal With the circuit described up to this point, the sequence of the gating signals G, H, and I of FIG. 1 supplied by the gating generator 7 could begin with any one of the three output signals providing the gating signal for a particular gating circuit. Provision must, therefore, be made to initially establish the proper synchronization between the gating signals provided by gating signal generator 7 and the phase shift keyed signal and to reestablish the synchronization in the event it should be lost due to the interference or interruption of the phase shift keyed signal.

Two conditions are possible when the proper gating signals are not supplied to gating circuits 4, 5, and 6 from gating signal generator 7. The operation of gating generator 7 could be altered so that the gating circuit 4 receives waveform H instead of G, gating circuit 5 receives waveform I and gating circuit 6 receives waveform G. The output of gating circuit 4 is then waveform K, that is, pulses corresponding to the transitions from positive to negative polarity of the 240° phase portions of the phase shift keyed signal. Gating circuit 5 then has no output since the input signals F and I applied to the gating circuit 5 do not occur at the same time. The output of the gating circuit 6 is that of waveform J, that is, pulses corresponding to the transitions from positive to negative polarity of the 0° phase portions phase shift keyed signal.

The other undesired condition of operation of the detector circuit occurs when the gating circuit 4 receives gating signal I, gating circuit 5 receives gating signal G, and gating circuit 6 receives gating signal H. Gating circuit 4 will then have no output. The output of gating circuit 5 is then shown by waveform J, while the output of gating circuit 6 is shown by waveform K.

As was previously mentioned, gating circuit 6 does not have an output signal when the detector circuit is operating properly. However, when the detector circuit is not operating properly, gating circuit 6 does have an output providing an indication that the output signals of the gating signal generator 7 are not properly synchronized with the phase shift keyed signal. The output of gating circuit 6 is, therefore, utilized to provide extra triggering pulses to the gating signal generator 7 which forces the gating signal generator 7 back into the proper phase relationship with the applied phase shift keyed signal.

In theory, the presence of a pulse at the output of the gating circuit 6 indicates that gating generator 7 is not providing the gating signal at the proper time with relaton to the phase shift keyed signal so that it should be possible to apply the output of the gating circuit 6 directly to the gating generator 7. In practice, however, pulses may momentarily appear at the output of the gating circuit 6 under noisy conditions without the gating generator 7 being out of step. The output of gating circuit 6 is, therefore, applied to an integrator-rectifier circuit 9 which provides the control signal for a conventional "one-shot" multivibrator circuit 10. The output of the multivibrator 10 is applied to the gating generator 7. Each time an output pulse is provided by the multivibrator 10, the next space discharge device of the gating generator 7 to become conductive is made conductive. In this way, the gating signals provided by the gating generator 7 and the phase shift keyed signal to be detected are brought back into the proper phase relationship.

The direct current output from the integrator-rectifier circuit 9 used to control the "one-shot" multivibrator 10 must be brought to a predetermined level before the "one-shot" multivibrator 10 fires. How fast this direct current level is reached is dependent on the time constant of the integrating portion of the integrator-rectifier circuit 9. By varying the time constant of the integrator, it is possible to optimize the detector circuit for best rejection of spurious pulses appearing at the output of the gating circuit 6 and prompt phase correction when required.

The reference signal generator 8 includes two oscillators tuned to three times the frequency of the carrier signal. One is driven oscillator 11 and the other is an oscillator 12. The outputs of each of the oscillators 11 and 12 are applied to a conventional phase detector circuit 13 which provides a direct current output signal as a measure of the difference in phase between the two oscillator outputs. This direct current output signal is used to alter the frequency of each of the oscillator circuits 11 and 12. This is accomplished by applying the direct current output signal of the phase detector 13 to a reactance tube which varies its reactance in response to the applied direct current signal. In the circuit shown in FIG. 2, reactance tubes 14 and 15 provide the variable reactance and are connected to respond to the output of the phase detector 13 and are connected to oscillators 11 and 12, respectively, to present a variable capacitive reactance.

Though oscillators 11 and 12 are each tuned to three times the frequency of the carrier signal and oscillator 11 alone could be used to drive the gating generator 7, there are advantages which accrue through the use of the arrangement just described. First, the output signal supplied by oscillator 12 to drive the gating signal generator 7 is more stable since the effect of circuit noise and transients is diminished. Second, the phase detector connected to each of the oscillators 11 and 12 provides a means of using the phase developed between oscillator 11 and oscillator 12 due to any change in the repetition rate of the synchronizing pulses applied to oscillator 11 to provide automatic frequency control. Slight change in the frequency of the phase shift keyed signal may occur during the transmission process which would be reflected by a change in the repetition rate of the synchronizing pulses for signal generation.

A second embodiment of the invention is represented by the detector circuit shown in FIG. 3. Some portions of the circuit represented in FIG. 3 are the same as the circuit shown in FIG. 2, and identified by the same numbers used in FIG. 2. The difference in the two circuits is in the manner in which synchronizing pulses are supplied to the signal generator 8. Thus, there is no connection shown in FIG. 3 between signal generator 8 and the output of clipping circuit 3. In the circuit shown in FIG. 3, the outputs of gating circuits 4, 5, and 6 are combined in such a manner that an uninterrupted train of equally spaced pulses is provided for synchronizing the operation of the signal generator 8 whenever a phase shift keyed signal is received.

Thus, when gating circuits 4 and 5 have output pulses as indicated by waveforms J and K of FIG. 1, it is possible to combine them to form a series of pulses which have a repetition rate equal to the carrier signal. One way of accomplishing this is shown in FIG. 3. The output of gate 4 is applied to a delay circuit 16 which delays each pulse of the output of gate 4 120° or ⅓ of the period of the carrier signal. The output of the delay circuit 16 is shown at M in FIG. 1. The output pulses from gate 5 and the delay circuit 16 are applied to an "or" circuit 17 which passes both the output pulses from gate 5 and the pulses from the delay circuit 16 to provide the wave form shown at N in FIG. 1. The output of the "or" circuit 17 is applied as the synchronizing signal for the driven oscillator 11 of signal generator 8.

The output of gating circuit 6 is also applied to a delay circuit 18 which delays the output of gating circuit 6 240° or ⅔ of the period of the carrier signal. The output of delay circuit 18 is also applied to the "or" circuit 17. As previously indicated, gating circuit 6 may have an output represented by waveform J when the gating circuit 4 has an output represented by waveform K. The output of the "or" circuit 17 will be as shown by waveform H, except that each pulse will lag the pulses of waveform H by ⅓ of the period of the carrier signal. Similarly, gating circuit 6 may have an output represented by waveform K while gating circuit 5 has an output represented by waveform J. The output of the "or" circuit 17 will then be as shown by waveform N, except that each pulse will lag the pulses of waveform N by ⅔ of the period of the carrier signal.

It is apparent that appropriate delay circuits could be used in conjunction with the output of any two of the gating circuits 4, 5, and 6 to obtain the synchronizing signal consisting of a continuous series of equally spaced pulses such as that shown at N in FIG. 1.

A synchronizing signal such as that shown at N in FIG. 1 is especially desirable where the synchronizing of the signal generator 8 is to be a one-to-one basis. For example, oscillator 11 of signal generator 8 could be preceded by an oscillator tuned to the carrier frequency which would then provide the synchronizing signal for oscillator 11.

It is also possible where the signal generator 8 uses a driven oscillator such as oscillator 11 tuned to three times the frequency of the carrier signal that the outputs of gates 4, 5, and 6 could be applied directly to the "or" circuit 17 and then to oscillator 11. Delay circuits 16 and 18 would not be needed.

The output of the gating circuit 6 can be applied directly to the integrating and rectifying circuit 9 as was done in the circuit shown in FIG. 2 or it can be integrated and rectified by the integrating and rectifying circuit 9 after it has been delayed by delay circuit 18 as shown in FIG. 3.

The detector circuit shown in FIG. 2 and the detector circuit shown in FIG. 3 each utilize the output of gates 4 and 5 to reproduce the information signal shown at B in FIG. 1. An output circuit 19 connected to the output of gate 4 and 5 is used to provide an output as shown at O of FIG. 1 which is substantially the same as the information signal shown at B in FIG. 1. There are a number of circuits that may be used. Thus, the output of gates 4 and 5 can be used to provide the triggering signals for a bistable multivibrator which will provide an output as shown at O in FIG. 1. A bistable multivibrator is especially useful for high speed operation. It is also possible to use the output of gating circuit 4 to supply the triggering signal for a conventional "one-shot" multivibrator and the output of gating circuit 5 to provide the triggering signal for a second conventional "one-shot" multivibrator. The outputs of the "one-shot" multivibrators are then rectified, integrated, and combined to produce the waveform shown at O of FIG. 1.

Figure 4:
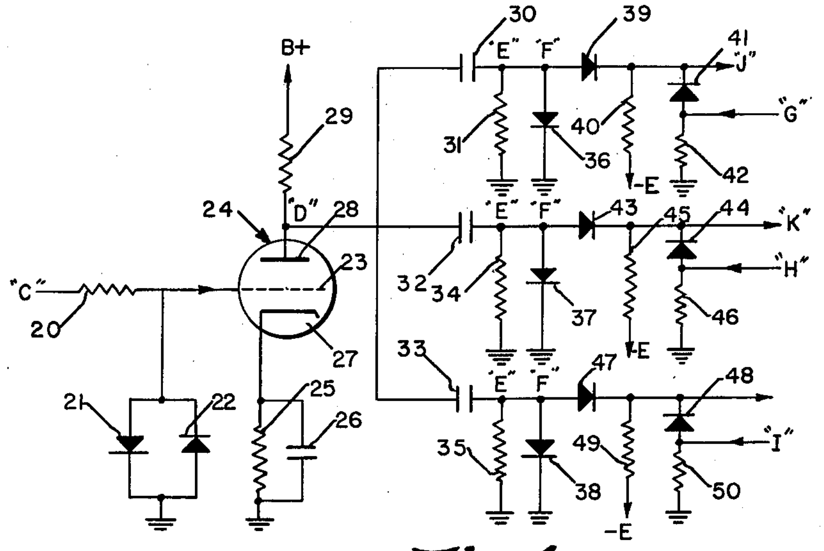
FIG. 4 illustrates a limiter amplifier circuit, differentiating circuit, a clipping circuit, and "and" gating circuits.

FIG. 4 illustrates circuits usable as the limiter-amplifier circuit 1, differentiating circuit 2, clipping circuit 3, and gating circuits 4, 5, and 6, indicated in the embodiments shown in FIGS. 2 and 3.

The limiter-amplifier circuit 1 includes the resistor 20 connected in series with the parallel connected, but oppositely poled, diodes 21 and 22. The diodes 21 and 22 are connected to ground. The phase shift keyed signal illustrated at C in FIG. 1 is applied across the resistor 20 and the parallel connected diodes 21 and 22. The voltage signal appearing across the diodes 21 and 22 is a squarewave and is applied to the control grid 23 of a vacuum tube 24 which is connected as an amplifier. The tube 24 is cathode biased using resistor 25 connected in parallel with bypass capacitor 26 between the cathode 27 of tube 24 and ground. The plate 28 of tube 24 is connected to the B+ or plate voltage supply via a load resistor 29. A voltage signal appearing between the plate 28 and ground is illustrated by the waveform shown at D in FIG. 1.

The differentiating circuit indicated by block 2 in FIGS. 2 and 3 includes three R-C differentiating circuits, each of which are connected between the plate 28 of tube 24 and ground. Each differentiating circuit includes a capacitor connected in series with a resistor with the capacitor connected to the plate 28 and the resistor connected to ground. Thus, capacitor 30 and resistor 31 constitutes one differentiating circuit, while capacitors 32 and 33 connected to resistors 34 and 35, respectively, form the other two differentiating circuits. The voltage signal appearing across each of the resistors 31, 34, and 35 is the waveform shown at E in FIG. 1.

A diode connected in parallel with the resistor of each R-C differentiating circuit forms a parallel diode clipper indicated by block 3 of FIGS. 2 and 3. The diode is poled so that it presents a high resistance to a negative voltage signal appearing across the resistor and a low resistance to a positive voltage signal applied to it. The positive going pulses appearing across the resistors of the differentiating circuits are therefore effectively shorted out by the diodes 36, 37, and 38 connected in parallel with resistors 31, 34, and 35, respectively, to form parallel diode clipper circuits. The voltage waveform appearing across diodes 36, 37, and 38 is shown at F in FIG. 1.

The gating circuits 4, 5, and 6 are similar and are illustrated in FIG. 4 connected to diodes 36, 37, and 38, respectively. Gating circuit 4 includes a diode 39 having its anode connected to the anode of diode 36 and its cathode connected to one end of a resistor 40 and the cathode of a diode 41. The other end of resistor 40 is connected to a source of negative bias voltage, designated as —E, while the anode of diode 41 is connected to ground via a resistor 42. Diode 39 is poled to present a low resistance path to current flowing from diode 36 to diode 41. Diode 41 is poled to present a low resistance path to current flowing from resistor 42 to diode 39. The gating circuit 5 connected across diode 37 is like gating circuit 4 and includes diodes 43 and 44 and resistors 45 and 46 which correspond to diodes 39 and 41 and resistors 40 and 42, respectively, of gating circuit 4. Similarly, gating circuit 6 connected across diode 38 includes diodes 47 and 48 and resistors 49 and 50 which correspond to diodes 39 and 41 and resistors 40 and 42, respectively, of gating circuit 4.

In order that an output signal appear between ground and the junction of diode 39 and diode 41, it is necessary that a negative voltage be applied at the connection common to diode 41 and resistor 42. The gating circuits 5 and 6 operate in a similar manner. Thus, waveforms G, H, and I are applied via coupling capacitors (not shown) to the junction of diode 41 and resistor 42, diode 44 and resistor 46, and diode 48 and resistor 50, respectively. With waveform F applied to diode 39, the output for gate 4 is then waveform J shown in FIG. 1 and appears between the cathode of diode 41 and ground. With waveform F applied to diode 43, the output for gating circuit 5 is the waveform K shown in FIG. 1 and appears between the cathode of diode 44 and ground. Any output from gating circuit 6 appears between the cathode of diode 48 and ground.

Figure 5:
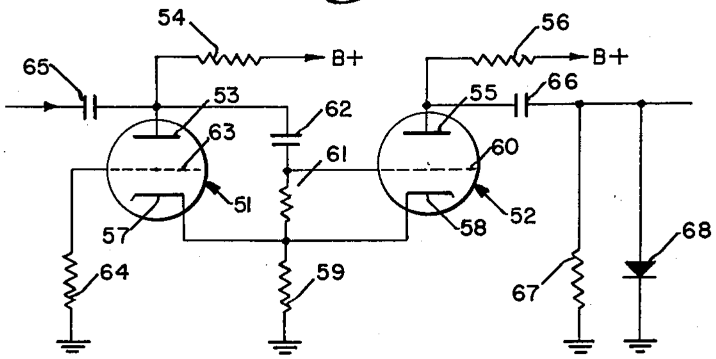
FIG. 5 illustrates a delay circuit.

A delay circuit usable in the embodiment illustrated in FIG. 3 for delay circuits 16 and 18 is illustrated in FIG. 5. The delay circuit illustrated in FIG. 5 includes a conventional "one-shot" cathode coupled multivibrator which has its output applied to a differentiating circuit and a clipping circuit. The multivibrator includes two vacuum tubes 51 and 52, each having a plate, a control element, and a cathode. The plate 53 of tube 51 is connected via a load resistor 54 to the plate voltage supply B+. The plate 55 of tube 52 is similarly connected via a load resistor 56. The cathodes 57 and 58 are connected together and are connected to ground via a resistor 59. The cathodes 57 and 58 are also connected to the control element 60 of tube 52 via resistor 61. The plate 53 of tube 51 is coupled to the control element 60 of device 52 via a capacitor 62. The grid or control element 63 of tube 51 is connected to ground via resistor 64. A capacitor 65 is used to couple an input signal source to the delay circuit. The capacitor 65 is connected to the plate 53 of the device 51.

The tube 52 will normally be conducting since its control element 60 is connected to its cathode 58 and no current is flowing in resistor 61 with tube 51 not conducting. Tube 51 is not conducting since its control element 63 is connected directly to ground by resistor 64 and its cathode is above ground potential due to current flowing in resistor 59. The voltage developed across resistor 59 is sufficient to hold tube 51 beyond cutoff.

The signal applied to tube 51 is applied via capacitor 65 and is supplied by the gating circuit to which it may be connected. The input pulses to tube 51 will therefore be negative going pulses. Each pulse causes tube 51 to conduct. Conduction of tube 51 causes its plate voltage to decrease. This decrease in plate voltage is applied to the control element 60 of tube 52 causing it to conduct less, which decreases the voltage developed across resistor 59, causing a further decrease in the current flow through tube 52. The action is cumulative until the device 52 is driven beyond cutoff by the drop in the plate voltage of device 51. As the device 52 is cut off, its plate voltage increases. Capacitor 62 then discharges the control element voltage of tube 52, causing it to conduct once again with a resulting decrease in its plate voltage. The time interval between the decrease and the following increase in the plate voltage device of tube 51 is, of course, dependent on the time constant of the discharge circuit for capacitor 62 which is adjusted so that its interval is equal to 120 electrical degrees or ⅓ of the interval between pulses in the signal applied to tube 51 in the case of delay circuit 16 and is adjusted so that this interval is equal to 240 electrical degrees or ⅔ of the interval between pulses in the signal applied to device 51 in the case of delay circuit 17. Thus, the plate voltage of tube 52 increases when it is made nonconductive as a result of a negative pulse applied to the plate 53 of tube 51 and then decreases when it becomes conductive again.

The voltage appearing between the plate 55 of tube 52 and ground is applied to a differentiating circuit consisting of a capacitor 66 connected to plate 55 and in series with a resistor 67. Thus, a voltage signal is developed across resistor 67 consisting of a series of positive and negative going pulses, the negative going pulses corresponding to the decrease in plate voltage and the positive going pulses corresponding to the increase of plate voltage of tube 52. The capacitor 66 is connected to the plate 55 of tube 52, while the resistor 67 is connected to ground.

A diode 68 is connected in parallel with resistor 67 to form a parallel diode clipper and is poled to present a low resistance path to positive going pulses and a high resistance path to negative going pulses. The voltage signal appearing across diode 68 is thus a series of negative going pulses, one for each of the negative pulses applied to the plate 53 of tube 51. The negative going pulses appearing across diode 68, however, are delayed dependent on the time constant of the discharge circuit for capacitor 62.

Figure 6:
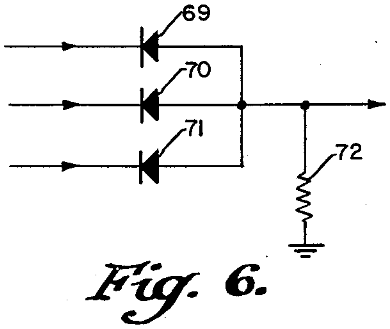
FIG. 6 illustrates an "or" gating circuit.

A circuit usable in the embodiment shown in FIG. 3 for the "or" circuit 17 is illustrated in FIG. 6. This circuit includes diodes 69, 70, and 71 connected in parallel and then in series with a resistor 72. The anode of each diode is connected to resistor 72. Two of the diodes are connected to the delay circuits 16 and 18, while the third diode is connected to gating circuit 5. Since each of the signals applied to the diodes are negative going pulses, they will be passed by the diodes and appear across resistor 72.

Figure 7:
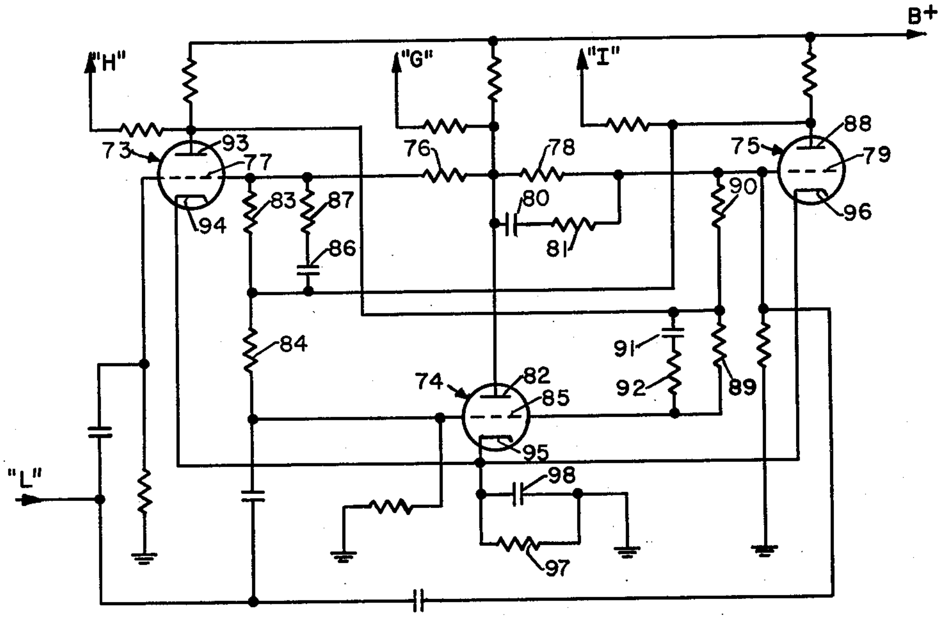
FIG. 7 illustrates a ring counter circuit.

A ring counter circuit usable in the embodiments illustrated in FIGS. 2, 3 for the gating signal generator circuit 7 is illustrated in FIG. 7. The ring counter illustrated includes three triode type vacuum tubes 73, 74, and 75, only one of which conducts at any one time. The tubes are made conductive in sequence with a different one conducting each time the output signal L of signal generator 8 reaches a particular value during each cycle of the signal. Thus, tube 73 conducts after tube 74, followed by tube 75. A negative pulse equal in width to the period of conduction is thus available at the plate of the conducting tube to supply the gating signals shown at G, H, and I of FIG. 1. Thus, for the sequence indicated, waveforms G, H, and I would be representative of the signal appearing at the plates of tubes 74, 73, and 75, respectively.

The control elements of each of the tubes 73, 74 and 75 are interconnected. A resistor 76 connected to control element 77 of tube 73 and in series with a resistor 78 connected to control element 79 of tube 75 provides the interconnection between control element 77 and control element 79. A capacitor 80 and a series connected resistor 81 are connected in parallel with a resistor 78. The plate 82 of tube 74 is connected to the connection common to resistor 76 and resistor 78. Similarly, a resistor 83 is connected to control element 77 of tube 73 and in series with a resistor 84 connected to control element 85 of tube 74 to provide the interconnection between the control elements of tubes 73 and 74. A capacitor 86 and a series connected resistor 87 are connected in parallel with resistor 83. The plate 88 of tube 75 is connected to the connection common to resistor 83 and resistor 84. A resistor 89 and a series connected resistor 90 provide the interconnection between control element 85 of tube 74 and control element 79 of tube 75. Resistor 89 is connected to control element 85 while resistor 90 is connected to control element 79. A capacitor 91 and a series connected resistor 92 are connected in parallel with resistor 89. The plate 93 of tube 73 is connected to the connection common to the resistors 89 and 90.

The cathodes 94, 95, and 96 of tubes 73, 74, and 75, respectively, are connected directly together and thence to ground via a resistor 97. A bypass capacitor 98 is connected in parallel with resistor 97.

Each of the control elements of the tubes 73, 74, and 75 are resistance-capacitance coupled to the output of signal generator 8. The plates of tubes 73, 74, and 75 are connected to the plate voltage supply B+ in the usual manner.

Figure 8:
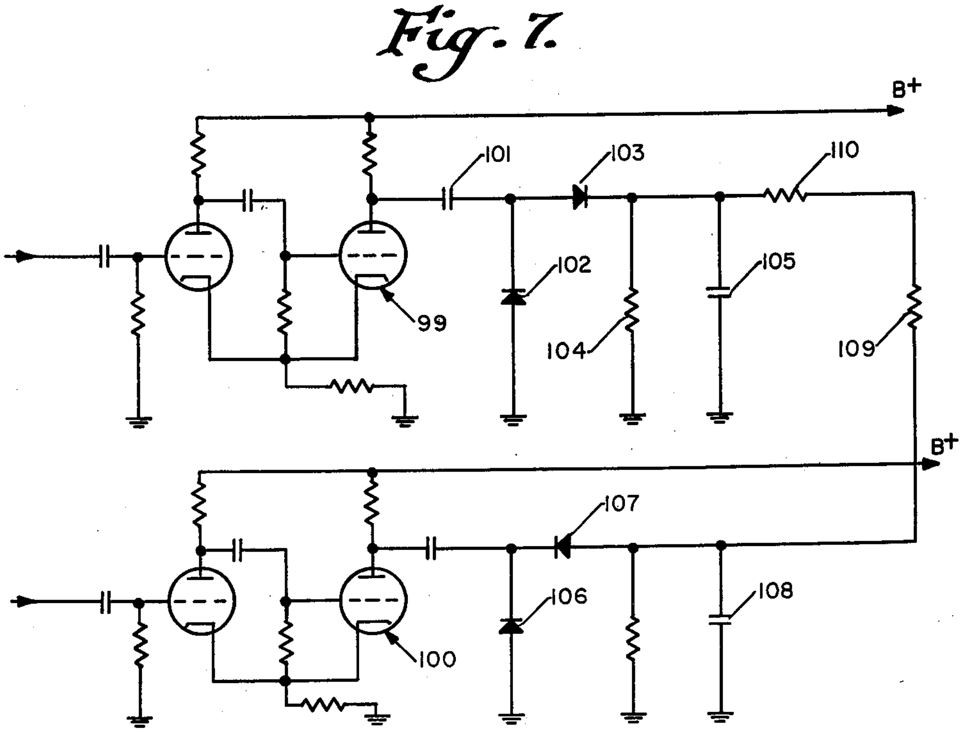
FIG. 8 illustrates an output circuit.

A circuit usable in the embodiments shown in FIGS. 2 and 3 as the output circuit 19 to reconstitute the information signal shown at B of FIG. 1 from the output of gating circuits 4 and 5 is illustrated in FIG. 8. The circuit includes two conventional "one-shot" cathode-coupled multivibrators 99 and 100. The input for multivibrator 99 is provided by the pulse output of gate 4 which is first amplified by a conventional amplifier circuit (not shown). The input for multivibrator 100 is provided in a similar manner from the pulse output of gate 5. The output of each multivibrator is a pulsating direct current which appears at the plate of the second tube of each multivibrator.

The output of gate 4 must provide a "mark" information signal since it passes pulses derived from the 0° phase portions of the phase shift keyed signal which are transmitted in response to "mark" information signals. The output of multivibrator 99 is, therefore, applied to a circuit which removes the negative going portions of the pulsating direct current output signal and then integrates the positive going pulses to form a "mark" information signal. In the circuit shown in FIG. 8, the output of multivibrator 99 is applied to a capacitor 101 connected in series with a diode 102 which is poled to present a low resistance to the negative going portions of the pulsating signal. A diode 103 and a series connected resistor 104 are connected in parallel with the diode 102. The diode 103 has its anode connected to the connection common to diode 102 and capacitor 101. The diode 103 thus presents a low resistance path for the positive going portions of the pulsating signal. The positive pulses developed across resistor 104 is integrated by a capacitor 105 connected in parallel with resistor 104 to form a "mark" information signal.

The output of gate 5 must provide a "space" information signal since it passes pulses derived from the 240° phase portions of the phase shift keyed signal which are transmitted in response to "space" information signals. The output of multivibrator 100 is applied, therefore, to a circuit which removes the positive going portions of the pulsating direct current signal and integrates the negative going portions to form a "space" information signal. The circuit to accomplish this is the same as that connected to the output of multivibrator except diodes 106 and 107, corresponding diodes 102 and 103, respectively, are poled in the opposite direction. The "space" information signal appears across capacitor 108.

It will be understood that the designation "mark" and "space" is arbitrary and for the purpose of distinguishing between them. Thus, either gate 4 or gate 5 may actually convey the "mark" signal in any system so long as identity is preserved. The choice of phase angles used and forbidden is likewise arbitrary and fixed only as to a particular system.

The signals obtained across capacitors 105 and 108 are presented between an output terminal and ground. Two series connected resistors 109 and 110 are connected between capacitors 105 and 108. The output signal is taken between the connection common to resistors 105 and 108 and ground.

Figure 9:
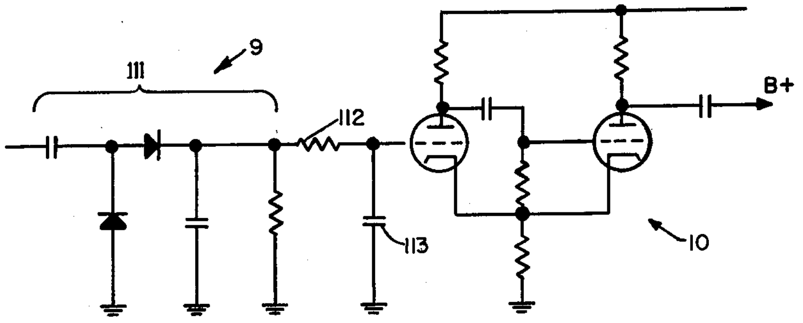
FIG. 9 illustrates a rectifier-integrator circuit and a multivibrator circuit.

Circuits usable in the embodiments shown in FIGS. 2 and 3 as the rectifier-integrator circuit 9 and the multivibrator 10 are shown in FIG. 9. The input to the circuit shown is a pulsating direct current signal which is rectified and integrated by the circuit indicated within the bracket 111 which is of the same type as described in conjunction with the rectification and integration of the output of multivibrator 99 in FIG. 8. A resistance 112 connected in series with a capacitor 113 is connected between the circuit indicated at 111 and the ground. The voltage developed across capacitor 113 is connected as the triggering signal for the multivibrator 10. The resistance 112 and capacitor 113 are used to adjust the time required for the input to circuit 9 to produce a voltage sufficient to trigger multivibrator 10 and thus prevent spurious pulses appearing at the output of gating circuit 6 from triggering the multivibrator 10.

Figure 10:
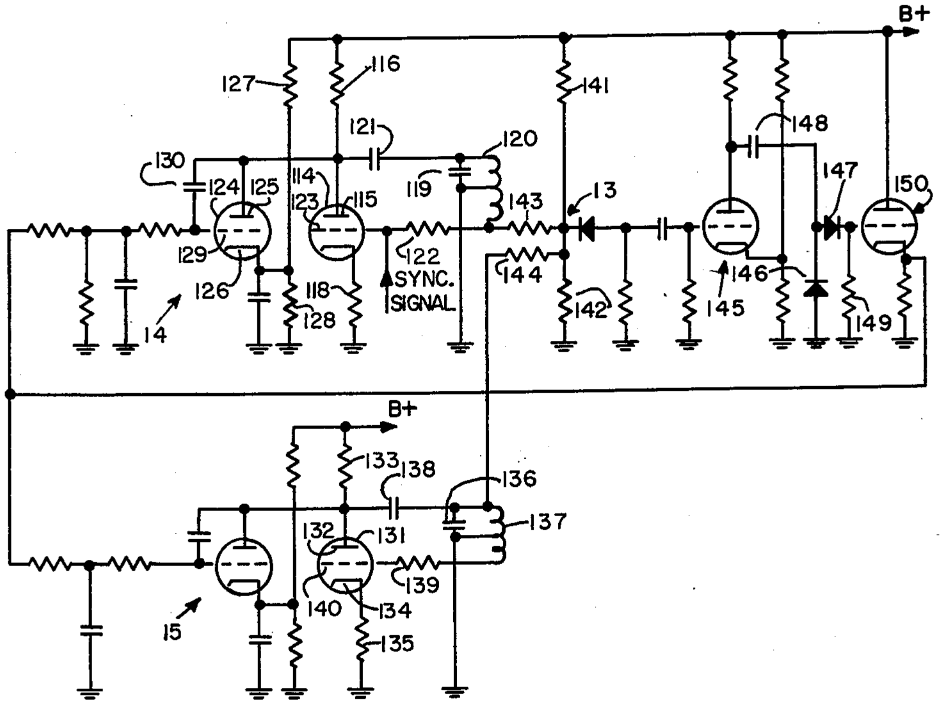
FIG. 10 illustrates a signal generator circuit.

A circuit usable in the embodiments of FIGS. 2 and 3 as the signal generator 8 is illustrated in FIG. 10. The various portions of the signal generator 8 are indicated by the same reference numerals as were used in FIGS. 2 and 3.

The driven oscillator 11 includes a triode type vacuum tube 114. The plate 115 of tube 114 is connected to the B+ supply voltage via a resistor 116. The cathode 117 of tube 114 is connected to ground via a resistor 118. A tuned circuit including a capacitor 119 connected in parallel with a portion of an inductance coil 120 is coupled to the plate 115 via a capacitor 121. The other side of the tuned circuit is connected to ground. A resistor 122 is connected to the control element 123 of tube 114 and in series with the remaining portion of the inductance coil 120. The two portions of the inductance coil are mutually coupled. The synchronizing signal for oscillator 11 is applied to the control element 123.

The reactance tube circuit 14 is conventional and includes a triode type vacuum tube 124 which is connected across the capacitor 119 of the tuned circuit of the driven oscillator 11 and capacitor 121 to vary the frequency of the oscillator 11 in accordance with the signal applied to the reactance tube circuit. Thus, the plate 125 of tube 124 is connected to the plate 115 of tube 114. The cathode 126 of tube 124 is connected to a portion of the B+ supply voltage. Two series connected resistors 127 and 128 are connected across the B+ supply voltage and the cathode 126 is connected to the connection common to resistors 127 and 128. The plate 125 of tube 124 is coupled to the control element 129 via a capacitor 130.

The oscillator 12 includes a triode type vacuum tube 131. The plate 132 of tube 131 is connected to the B+ supply voltage via a resistor 133. The cathode 134 of tube 131 is connected to ground via a resistor 135. A tuned circuit including a capacitor 136 connected in parallel with a portion of an inductance coil 137 is coupled to the plate 132 via a capacitor 138. The other side of the tuned circuit is connected to ground. A resistor 139 is connected to the control element 140 of tube 131 and in series with the remaining portion of the inductance coil 137. The two portions of the inductance coil 137 are mutually coupled.

The reactance tube circuit 15 is the same as the reactance tube circuit 14 and is connected to the oscillator 12 in the same manner that reactance tube circuit 14 is connected to oscillator 11.

The signal appearing between ground and the connection common to resistor 122 and inductance coil 120 is applied to a phase detector 13 which includes two series connected resistors 141 and 142 connected between the B+ voltage supply and ground. A resistor 143 is connected between the connection common to resistors 141 and 142 and the connection common to resistor 122 and inductance coil 120 of oscillator 11. A resistor 144 is connected between the connection common to resistors 141 and 142 and the connection common to capacitors 136 and 138 of oscillator 12.

The voltage at a given instant of time at the point intermediate the two resistors 141 and 142 will vary dependent on the voltage then present at the connection common to the resistor 122 and the inductance coil 120 of oscillator 11 and the voltage present at the connection common to the capacitors 138 and 136 of oscillator 12.

The voltage appearing across resistor 142 will be a fluctuating direct current signal which is amplified by the amplifier indicated generally at 145. The output of amplifier 145 is rectified by the diodes 146 and 147 coupled to the plate of the amplifying tube of amplifier 145 via a capacitor 148. Diode 146 has its anode connected to ground and its cathode, together with the anode of diode 147 connected to capacitor 148.

The signal developed across a resistor 149 which is connected between the cathode of diode 147 and ground is applied as the input signal for reactance circuit 14 and reactance circuit 15 via a conventional cathode follower circuit indicated at 150 and conventional resistance-capacitance coupling circuits.

Modifications of this invention not described herein will become apparent to those of ordinary skill in the art. Therefore, it is intended that the matter contained in the foregoing drawings be interpreted as illustrative and not limitative, the scope of the invention being defined in the appended claims.

We claim:

1. A detector circuit for phase shift keyed signals of a transmitted frequency with portions of at least two different predetermined phases and not more than $N-1$ different predetermined phases, where N is an integer greater than 2 and equal to $$\frac{360°}{\theta}$$

and $\theta$ is a phase angle which is divisible into 360° a whole number of times, the combination comprising: means responsive to said phase shift keyed signal providing an output signal condition for each transition from a given polarity to the opposite polarity of said phase shift keyed signal; N gating circuits, each requiring first and second input signal conditions to be applied to it at the same time to produce a predetermined output signal condition; means applying said output signal condition of said first-mentioned means to each of said N gating circuits as said first input signal condition; means connected to each of said N gating circuits providing said second input signal condition in sequence to a different one of each of said N gating circuits at a rate equal to the frequency of said phase shift keyed signal with N phase relationships possible between said second input signal condition for a given one of said gating circuits and said phase shift keyed signal, whereby N minus the number of said different phase portions of said N gating circuits has only one of said first and second signal conditions applied to it for one of said N phase relationships with at least one of said N minus the number of said different portions of said N gating circuits providing said predetermined signal condition for the remaining $N-1$ phase relationships; and means operatively connecting the predetermined output of each of said N minus the number of different phase portions of said N gating circuits to said means providing said second input signal condition to alter the phase relationship between the second input signal condition supplied to said given one of said N gating circuits and said phase shift keyed signal.

2. In a detector circuit for phase shift keyed signals of a transmitted frequency with portions of at least two different predetermined phases and not more than $N-1$ different predetermined phases, where N is an integer greater than two and equal to $$\frac{360^\circ}{\theta}$$

and $\theta$ is a phase angle which is divisible into 360° a whole number of times, the combination comprising; means developing a signal from said phase shift keyed signal having a frequency which is N times the frequency of the phase shift keyed signal; means responsive to said phase shift keyed signal providing an output signal condition for each transition from a given polarity to the opposite polarity of said phase shift keyed signal; N gating circuits, each requiring first and second input signal conditions to be applied to it at the same time to produce a predetermined output signal condition; means for applying the output signal condition of said second-mentioned means to each of said gating circuits as said first input signal condition; a gating signal generator connected to each of said N gating circuits providing said second input signal condition to one of said N gating circuits at any instant of time said gating signal generator including means responsive to the signal developed by said first-mentioned means to apply said second input signal condition in sequence to a different one of each of said N gating circuits at a rate equal to the frequency of said phase shift keyed signal, whereby N minus the number of said different phase portions of said N gating circuits has only one of said first and second signal conditions applied to it for a given phase relationship between the second input condition supplied by said gating signal generator to a given one of said N gating circuits and said phase shift keyed signal, while at least one of said N minus the number of different phase portions of said N gating circuits provides said predetermined output signal condition for any other phase relationship possible between said second input signal condition supplied to said given one of said N gating circuits and said phase shift keyed signal; and means applying the output of each of said N minus the number of different portions of said N gating circuits to said gating signal generator to alter the phase relationship between said second input condition signal supplied by said gating signal generator to a given one of said N gating circuits.

3. In a detector circuit for phase shift keyed signals of a transmitted frequency with portions of at least two different predetermined phases and not more than $N-1$ different predetermined phases, where N is an integer greater than two and equal to $$\frac{360^\circ}{\theta}$$

and $\theta$ is a phase angle which is divisible into 360° a whole number of times, the combination comprising: means responsive to said phase shift keyed signal providing an output signal condition for each transition from a given polarity to the opposite polarity of said signal; N gating circuits, each requiring first and second input signal conditions to be applied to it at the same time to produce a predetermined output signal condition; means applying the said output signal condition of said first-mentioned means to each of said gating circuits as said first input signal condition; a signal generator having an output signal equal to N times the frequency of the phase shift keyed signal; means applying said output signal conditions of said first-mentioned means to said signal generator to synchronize the operation of said signal generator; a gating signal generator connected to each of said N gating circuits providing said second input signal condition said gating signal generator including means responsive to the output signal of said signal generator to apply said second input condition in sequence to a different one of each of said N gating circuits at a rate equal to the frequency of said signal generator output with N phase relationships possible between said second input signal condition for a given one of said gating circuits and said phase shift keyed signal, whereby N minus the number of said different portions of said N gating circuits has only one of said first and second signal conditions applied to it for one of said N phase relationships with at least one of said N minus the number of said different portions of said N gating circuits providing said predetermined signal condition for the remaining $N-1$ phase relationships; and means operatively connecting the output of each of said N minus the number of different phase portions of said N gating circuits to said gating signal generator to alter the phase relationship between said second input condition signal supplied by said gating signal generator to a given one of N gating circuits and said phase shift keyed signal.

4. In a detector circuit for phase shift keyed signals of a transmitted frequency with portions of at least two different predetermined phases and not more than $N-1$ different predetermined phases, where N is an integer greater than two and equal to $$\frac{360^\circ}{\theta}$$

and $\theta$ is a phase angle which is divisible into 360° a whole number of times, the combination comprising: means responsive to said phase shift keyed signal providing an output signal condition for each transition from a given polarity to the opposite polarity of said signal; N gating circuits, each requiring first and second input signal conditions to be applied to it at the same time to produce a predetermined output signal condition; means applying the said output signal condition of said first-mentioned means to each of said gating circuits as said first input signal condition; a signal generator having an output signal equal to N times the frequency of the phase shift keyed signal; means operatively connecting said predetermined output signal condition of at least one of said N gates to said signal generator to synchronize the operation of said signal generator; a gating signal generator connected to each of said N gating circuits providing said second input signal condition said gating signal generator including means responsive to the output signal of said signal generator to apply said second input condition in sequence to a different one of each of said N gating circuits at a rate equal to the frequency of said phase shift keyed signal with N phase relationships possible between said second input signal condition for a given one of said gating circuits and said phase shift keyed signal, whereby N minus the number of said different portions of said N gating circuits has only one of said first and second signal conditions applied to it for one of said N phase relationships with at least one of said N minus the number of said different portions of said N gating circuits providing said predetermined signal condition for the remaining $N-1$ phase relationships; and means operatively connecting the output of each of said N minus the number of different phase portions of said N gating circuits to said gating signal generator to alter the phase relationship between said second input condition signal supplied by said gating signal generator to a given one of N gating circuits and said phase shift keyed signal.

5. A detector circuit for phase shift keyed signals of a transmitted frequency having a phase angle at any instant of time which is divisible by $\theta$ a whole number of times, where $\theta$ is a phase angle divisible into 360° a whole number of times, the combination comprising: means responsive to said phase shift keyed signal providing an output signal condition for each transition from a given polarity to the opposite polarity of said signal;

$$\frac{360°}{\theta}$$

gating circuits, each requiring first and second input signal conditions to be applied to it at the same time to produce a predetermined output signal condition; means applying the said output signal condition of said first-mentioned means to each of said gating circuits as said first input signal conditions; a signal generator having an output signal equal to $$\frac{360°}{\theta}$$

times the frequency of the phase shift keyed signal; means operatively connecting said predetermined output signal condition of at least one of said $$\frac{360°}{\theta}$$

gates to said signal generator to synchronize the operation of said signal generator; a gating signal generator connected to each of said $$\frac{360°}{\theta}$$

gating circuits providing said second input signal condition said gating signal generator including means responsive to the output signal of said signal generator to apply said second input condition in sequence to a different one of each of said $$\frac{360°}{\theta}$$

gating circuits at a rate equal to the frequency of said phase shift keyed signal.

6. A detector circuit for phase shift keyed signals of a transmitted frequency having a phase angle at any instant of time which is divisible by $\theta$ a whole number of times, where $\theta$ is a phase angle divisible into 360° a whole number of times, the combination comprising means responsive to said phase shift keyed signal providing an output signal condition for each transition from a given polarity to the opposite polarity of said phase shift keyed signal; a signal generator providing an output signal equal to $$\frac{360°}{\theta}$$

times the frequency of said phase shift keyed signal; means applying said output signal conditions of said first-mentioned means to said signal generator to synchronize the operation of said generator;

$$\frac{360°}{\theta}$$

gating circuits, each requiring first and second input signal conditions to be applied to it at the same time to produce a predetermined output signal condition; means applying said output signal condition of said first-mentioned means to each of said gating circuits as said first input signal condition; and means connected to each of said $$\frac{360°}{\theta}$$

gating circuits providing said second input signal condition in sequence to a different one of each of said $$\frac{360°}{\theta}$$

gating circuits in response to a repetitive input signal; and means connecting said signal generator output to said last-mentioned means providing said repetitive input signal for said last-mentioned means at a rate equal to the frequency of said signal generator output, whereby said second input signal condition is provided at a different one of each of said $$\frac{360°}{\theta}$$

gating circuits in sequence and at a rate equal to the frequency of said signal generator output with each of said second input signal conditions in phase with said first input condition at one of said $$\frac{360°}{\theta}$$

gating circuits.

7. A detector circuit according to claim 6 wherein said signal generator comprises a first oscillator synchronized by said output signal conditions of said first-mentioned means, said oscillator being tuned to $$\frac{360°}{\theta}$$

times the frequency of said phase shift keyed signal; a second oscillator tuned to $$\frac{360°}{\theta}$$

times the frequency of said phase shift keyed signal; a phase detector connected to the output of each of said oscillators; a first and second reactance which varies in response to variations in a signal condition applied to said reactances; means connecting said first reactance to said first oscillator to alter the tuning of said first oscillator in accordance with variations in said first reactance; means connecting said second reactance to said second oscillator to alter the tuning of said second oscillator in accordance with variations in said second reactance; and means connecting the output of said phase detector to said first and second reactances to provide said signal condition to which said reactance respond.

8. A detector circuit for phase shift keyed signals of a transmitted frequency having a phase angle at any instant of time which is divisible by $\theta$ a whole number of times, where $\theta$ is a phase angle divisible into 360° a whole number of times, the combination comprising: means developing a signal from said phase shift keyed signal having a frequency which is $$\frac{360°}{\theta}$$

times the frequency of the phase shift keyed signal; means responsive to said phase shift keyed signal providing an output signal condition for each transition from a given polarity to the opposite polarity of said phase shift keyed signal;

$$\frac{360°}{\theta}$$

gating circuits, each requiring first and second input signal conditions to be applied to it at the same time to produce a predetermined output signal condition; means for applying the output signal condition of said second-mentioned means to each of said gating circuits as said first input signal condition; and a gating signal generator connected to each of said $$\frac{360°}{\theta}$$

gating circuits providing said second input signal condition to one of said $$\frac{360°}{\theta}$$

gating circuits at any instant of time said gating signal generator including means responsive to the signal developed by said first-mentioned means to apply second input signal condition in sequence to a different one of each of said $$\frac{360^\circ}{\theta}$$

gating circuits at a rate equal to the frequency of said phase shift keyed signal.

9. In a receiver for phase shift keyed signals which are of a given frequency with portions of different phase, the combination comprising: means responsive to a phase shift keyed signal providing an output pulse for each transition from a given polarity to the opposite polarity of the phase shift keyed signal; a plurality of at least three gating circuits, each of said gating circuits requiring a first and second input signal to be applied to it at the same time to produce an output signal; means coupling each of said gating circuits to said first-mentioned means to apply the output pulses thereof as said first input signal; means responsive to the output of said gating circuits providing gating signals occurring in sequence at a plurality of at least three output terminals with the signal at each output terminal occurring at a rate equal to the frequency of the phase shift keyed signal; means coupling each of said gating circuits to a different one of said output terminals to apply the signals appearing thereat as said second input signal; and means responsive to an output pulse from first said means not corresponding to a said transition of polarity coupled to apply an additional said second output.

10. In a receiver for phase shift keyed signals which are of a given frequency with portions of different phase, the combination comprising: means responsive to a phase shift keyed signal providing an output pulse for each transition from a given polarity to the opposite polarity of the phase shift keyed signal; a plurality of gating circuits, each of said gating circuits requiring a first and second input signal to be applied to it at the same time to produce an output signal; means coupling each of said gating circuits to said first-mentioned means to apply the output pulses thereof as said first input signal; means responsive to the output of said gating circuits providing a signal having a frequency that is a multiple of the phase shift keyed signal; means responsive to the signal of said last-mentioned means providing gating signals occurring in sequence at a plurality of output terminals with the signal at each output terminal occurring at a rate equal to the frequency of the phase shift keyed signal; means coupling each of said gating circuits to a different one of said output terminals to apply the signals appearing thereat as said second input signal; means coupled to two of said gating circuits to provide an output signal of one magnitude in response to the output of one of said two gating circuits and an output of another magnitude in response to the output of the other of said two gating circuits; and means coupled to another of said gating circuits to supply an output therefrom as the succeeding said second signal at one said gate.

11. In a receiver for phase shift keyed signals which are of a given frequency with portions of different phase, the combination comprising: means responsive to a phase shift keyed signal providing an output pulse for each transition from a given polarity to the opposite polarity of the phase shift keyed signal; a plurality of at least three gating circuits, each of said gating circuits requiring a first and second input signal to be applied to it at the same time to produce an output signal; means coupling each of said gating circuits to said first-mentioned means to apply the output pulses thereof as the said first input signal; means responsive to the output of said gating circuits providing a signal having a frequency that is a multiple of the phase shift keyed signal; means responsive to the signal of said last-mentioned means providing gating signals occurring in sequence at a plurality of at least three output terminals with the signals at each output terminal occurring at a rate equal to the frequency of the phase shift keyed signal; means coupling each of said gating circuits to a different one of said output terminals to apply the signals appearing thereat as said second input signal; and means responsive to an output from first said means not representing a said transition of polarity providing a pulse at said output terminals as said second input signal to a gating circuit.

12. In a receiver for phase shift keyed signals which are of a given frequency and $N-1$ different phases, where N is an integer and each phase as measured from an arbitrary phase reference is a whole multiple of $\phi$ where $\phi$ is the largest increment of phase that can be divided into each of the N different phases a whole number of times, the combination comprising: means responsive to a phase shift keyed signal providing an output pulse for each transition from a given polarity to the opposite polarity of the phase keyed signal; means multiplying the recurrence rate of said output pulses by $$\frac{360}{\theta}$$

N gating circuits, each of said gating circuits requiring a first and second input signal to be applied to it at the same time to produce an output signal; means coupling each of said gating circuits to said multiplying means to apply the output pulses thereof as said first input signal at N output terminals with the signal at each said N output terminals occurring at the frequency of the phase shift keyed signal and having a duration equal to $$\frac{\phi}{360}$$

times the period of the phase shift keyed signal; means coupling each of said gating circuits to a different one of said output terminals to apply the signals appearing thereat as said second input signal; output circuit means responsive an output signal in $N-1$ of said gating circuits to produce a receiver output in response thereto; and pulse generating means responsive to an output signal in the other of said N gating circuits for advancing the time of occurrence of succeeding said gating signals by $$\frac{\theta}{360}$$

times the period of the phase shift keyed signal.

13. In a receiver for phase shift keyed signals which are of a given frequency with portions of $N-1$ of N different phases, where N is an integer and with the phase of any portion as measured from an arbitrary phase reference a whole multiple of an increment of phase $\phi$, where $\phi$ is the largest increment of phase that can be divided into any of the N different phases a whole number of times, the combination comprising: means responsive to a phase shift keyed signal providing an output pulse for each transition from a given polarity to the opposite polarity of the phase shift keyed signal; N gating circuits, each of said gating circuits requiring a first and second input signal to be applied to it at the same time to produce an output signal; means coupling each of said gating circuits to said first-mentioned means to apply the output pulses thereof at a frequency equal to $$\frac{360}{\phi}$$

times the frequency of the phase shift keyed signal as said first input signal; means responsive to the output signal of said last-mentioned means providing gating signals occurring in sequence at N output terminals with the signal at each of said N output terminals occurring at the frequency of the phase shift keyed signal and having a duration equal to $$\frac{\phi}{360}$$

times the period of the phase shift keyed signal; means coupling each of said gating circuits to a different one of said output terminals to apply the signals appearing thereat as said second input signal; means generating a signal in response a gate circuit output corresponding to the phase not included in said $N-1$ phases; and means applying last said signal when present as additional said first input signals.

14. In a receiver for phase shift keyed signals which are of a given frequency using portions of different phase, the used phases including an even number from an odd number of equal phase displacement from a selected initial phase, the combination comprising: means responsive to a phase shift keyed signal providing an output pulse for each transition from a given polarity to the opposite polarity of the phase shift keyed signal; a plurality of gating circuits equal to said odd number each of said gating circuits requiring a first and second input signal to be applied to it at the same time to provide an output signal; means coupling each of said gating circuits to said first-mentioned means to apply the output pulses thereof as said first input signal; frequency multiplying means responsive to the output of first said means providing a series of equally spaced signals having a repetition rate equal to the frequency of the phase shift keyed signal times said odd number; means responsive to said equally spaced signals providing gating signals occurring in sequence at a like odd plurality of output terminals with the signals at said output terminals occurring in successive order, and at a rate equal to the frequency of the phase shift keyed signal at each terminal; means coupling each of said gating circuits to a different one of said output terminals to apply the signals appearing thereat as said second input signal for said gating circuits; and means responsive to an output signal occuring in one said gating circuit corresponding to an unused one of said phases applied to said means providing gating signals thereby to advance said successive order of signals.

15. A communication receiver for a single frequency carrier wave which is phase shifted only into $N-1$ phase angles of which each angle is zero or an integer times $\theta$, where $N\theta=360°$ and N is an integer greater than 2, comprising means developing a series of pulses each corresponding in phase with one cycle of said wave as received; means generating a wave of said frequency times N synchronized by said pulses; time gate means including N ring-connected circuits said means actuated by each cycle of last said waves to produce in ordered succession a pulse at each of N output points for each cycle of received wave; N coincidence gating circuits each operative to produce an output when supplied with first and second input pulses; means delivering as a first said input pulse to each said coincidence circuit said series of pulses; means delivering as a second said input pulse to each coincidence gate, respectively, a pulse from one said time gate output point; means developing an output signal for each of $N-1$ coincidence gating circuits; and means applying an output in a remaining one of said N gating circuits when developed to advance said ordered succession time gate pulses.

16. In a communication system wherein information is transmitted by a single frequency wave phase shifted into $N-1$ phase angles according to said information of which each said angle is zero or an integer times $\theta$ where $N\theta=360°$ and N is an integer greater than 2, phase detection apparatus comprising receiving means developing a squared wave pulse synchronous in phase with each cycle of transmitted wave; means responsive to the receiving means generating N pulses in successively ordered intervals during each cycle of said wave; N gating circuits each requiring two coincident input pulses to produce an output signal; means simultaneously applying said synchronous pulses as a first input pulse to said N gating circuits; time gate means connected for one response to each said generated pulse and having N outputs each actuated only during one of said successively ordered intervals; means applying said time gate outputs one to each of said N gating circuits as a second input thereto; means deriving an information output signal from each of said N gating circuits which has a said input corresponding to one of said $N-1$ phase angles; means developing a signal in response to an output at another one of said N gating circuits and means applying last said signal as a further time gate input to advance the successive order of second pulse inputs to said gating circuits.

17. In a receiver for a communication system employing a fixed carrier frequency and $N-1$ phase shift positions of N equal phase increments per cycle, the remaining said phase position being forbidden; means developing pulses each synchronous with an instantaneously received phase of carrier signal; means developing N successively ordered like pulses for each cycle of received wave whereof one pulse coincides with a different said synchronous pulse for each of said $N-1$ phase positions; N "AND" gate means for providing $N-1$ output signals each connected to receive one input pulse from first said means and a further input pulse individual thereto which is a different one of said N pulses; means responsive to an output from the Nth said gate means for altering the one of said N pulses which coincides with said synchronous pulse, output at said Nth gate means being selected connected to indicate receipt of a wave of said forbidden phase position.

18. In the receiver of claim 17 said means developing N pulses including a ring timer of N steps equally spaced in a cycle of received wave and said output of the Nth gate means when present being applied as an additional input to shift the output of the ring timer.

19. In a communication system employing a single carrier frequency selectively phase keyed in predetermined multiples of a cycle fraction equal to the reciprocal of an odd integer larger than said predetermined multiples thereby to produce used phase allocations and a specified unused phase allocation; a phase modulation receiver developing an output individual to each of said phase allocations; means responsive to a said output corresponding to said specified unused allocation for causing rejection thereof as a system output; and means responsive to a said rejection output for applying a phase correction signal to said phase modulation receiver.

20. In a communication receiver according to claim 19, said receiver including a reference wave generating means operative at a frequency said integer times said carrier frequency and phase comparison means comprising coincidence gating means responsive to the instantly received phase and that cycle of said reference wave synchronous therewith, said phase correction means being applied to add a cycle to said reference wave.

References Cited in the file of this patent

UNITED STATES PATENTS

| | | |
|---|---|---|
| 2,527,650 | Peterson | Oct. 31, 1950 |
| 2,905,812 | Doelz et al. | Sept. 22, 1959 |
| 2,984,701 | Barry | May 16, 1961 |
| 3,037,079 | Crafts | May 29, 1962 |